United States Patent [19]

Kenney et al.

[11] Patent Number: 4,922,530

[45] Date of Patent: May 1, 1990

[54] ADAPTIVE FILTER WITH COEFFICIENT AVERAGING AND METHOD

[75] Inventors: John B. Kenney; Charles E. Rohrs, both of South Bend, Ind.; Wayne E. Walters, Naperville, Ill.

[73] Assignee: Tellabs, Inc., Lisle, Ill.

[21] Appl. No.: 348,156

[22] Filed: May 3, 1989

Related U.S. Application Data

[63] Continuation of Ser. No. 170,008, Mar. 18, 1988, abandoned.

[51] Int. Cl.$^5$ .............................................. H04B 3/23
[52] U.S. Cl. .............................. 379/411; 364/724.16; 370/32.1
[58] Field of Search ...................... 364/724.19, 724.16; 370/32.1, 32; 379/406, 410, 411; 333/28 R

[56] References Cited

U.S. PATENT DOCUMENTS 4,757,527  7/1988  Beniston et al. ................... 379/410

OTHER PUBLICATIONS

"A Single-Chip VLSI Echo Canceler," D. L. Duttweiler et al., The Bell System Technical Journal, Feb. 1980, vol. 59, No. 2, pp. 149-160.

Primary Examiner—Jin F. Ng
Assistant Examiner—Randall S. Vaas
Attorney, Agent, or Firm—Juettner Pyle Loyd & Verbeck

[57] ABSTRACT

An adaptive transversal filter is characterized by a first adaptive filter for generating a plurality of estimated impulse response coefficients representing an impulse response of a transmission path. An averaging circuit is coupled with the first adaptive filter, and generates a plurality of average estimated impulse response coefficients having values in accordance with the average values over a most recent time interval of associated ones of the estimated impulse response coefficients, and a second adaptive filter receives the average estimated coefficients. The average estimated impulse response coefficients more closely represent and have less variance with respect to the actual impulse response of the transmission path than do the estimated coefficients, and the second filter generates an estimate of an echo signal through a process including convolution of the average estimated coefficients and an input signal. The adaptive transversal filter is particularly suited for use in an adaptive hybrid circuit.

31 Claims, 2 Drawing Sheets

ADAPTIVE FILTER WITH COEFFICIENT AVERAGING AND METHOD

This is a continuation of co-pending application Ser. No. 07/170,008 filed on Mar. 18, 1988 now abandoned.

BACKGROUND OF THE INVENTION

The present invention relates to a novel adaptive filter and to operation of the same.

In a typical telephone connection, at each end of the network a four wire (4W) segment is joined with a two wire (2W) segment by a hybrid circuit. Impedance mismatch in a hybrid circuit may cause the 4W receive path signal, e.g., a far end speaker's voice signal, to be reflected onto the 4W transmit path as an echo signal. The hybrid circuits and two pairs of wires in the 4W segment form a loop around which echo signals propagate. Normally, at the ends of the network the 4W receive path signal is at a higher level than its echo on the transmit path, since there is loss across the hybrid circuit. This loss, which varies from one hybrid circuit to another, is a function of frequency and called transhybrid loss (THL).

It often is desirable to insert gain in the 4W paths to compensate for losses in the 2W segments, in which case the hybrid circuits provide loss and the gain stages provide gain. If, at any frequency, the inserted gain is greater than the sum of the losses in the two hybrid circuits, an unstable condition will exist. Once such a passband frequency is excited by a signal in either 2W path, it will continue to grow as it propagates around the loop, until it saturates at some level. This unstable condition is known as singing, and is an undesired self-sustaining oscillation at a frequency in the passband of the system. To avoid singing, either the gain must be decreased or the hybrid circut losses increased. Decreasing the gain may result in an unacceptable quality of service, so increasing the THL is the more desirable alternative of the two.

A common technique for increasing the THL of a hybrid circuit is to use an adaptive transversal filter with the circuit, resulting in a so-called adaptive hybrid. The adaptive filter operates much like an echo canceller, in that it generates an estimate of an impulse response of the end path coupling the 4W receive and transmit segments, and through a process including convolution of the estimated impulse response and receive path signal, develops an estimate of the echo on the transmit path. The echo estimate is subtracted from the transmit path signal, resulting in a residual signal that is used to update the estimate of the impulse response in a manner to reduce the power or absolute value of the residual signal. However, because of noise on the end path, which includes any near end speech signals, it often happens that the adaptive filter does not converge sufficiently to prevent singing on the network at desired gain levels.

OBJECTS OF THE INVENTION

An object of the present invention is to provide an improved adaptive filter for a telephone network.

Another object is to provide such an adaptive filter, for use in an adaptive hybrid circuit, that operates much like an echo canceller to effectively increase transhybrid loss.

A further object is to provide such an adaptive filter that, in increasing transhybrid loss, prevents occurrence of singing on the network.

SUMMARY OF THE INVENTION

In accordance with the present invention, an adaptive filter includes first signal processing means adapted to be supplied with an input signal and being responsive to an error signal for generating and periodically adjusting the values of a plurality of estimated impulse response coefficients, and averaging circuit means coupled with the first signal processing means for generating a plurality of average estimated impulse response coefficients having values in accordance with the average values over a most recent time interval of associated ones of the estimated coefficients. The adaptive filter also includes second signal processing means, adapted to be supplied with the input signal and coupled with the averaging circuit means, for receiving the average estimated impulse response coefficients and for generating an estimate of a signal correlated to the input signal.

In a preferred embodiment, the adaptive filter is used in an adaptive hybrid circuit that includes means adapted to be coupled to first, second and third transmission paths for coupling an input signal on the first path to the third path and an output signal on the third path to the transmit in path. In this case, the adaptive filter separates the second transmission path into transmit in and transmit out paths, the correlated signal is an echo signal on the transmit in path that is correlated to and occurs in response to the input signal on the first path, the second signal processing means generates an estimate of the echo signal on the transmit in path, and included are means coupled with the second signal processing means, and adapted to be coupled with the second path, for subtracting the estimate of the echo signal on the transmit in path from the signal on the path and for coupling the resulting signal to the transmit out path.

The invention also contemplates a method of generating an estimate of a signal on a second transmission path, that is correlated to and occurs in response to an input signal on a first transmission path. The method comprises the steps of generating a plurality of estimated impulse response coefficients that form an estimate of the impulse response exhibited by an end path of the first and second transmission paths, and periodically adjusting the values of the coefficients in accordance with the value of an error signal. Also included are the steps of generating a plurality of average estimated impulse response coefficients having values in accordance with the average values over a most revent time interval of associated ones of the estimated coefficients, and generating an estimate of the correlation signal on the second path through a process including convolution of the input signal and the average estimated impulse response coefficients.

In a contemplated practice of the method, signals are converted between first, second and third transmission paths, the second transmission path is separated into transmit in and transmit out paths, and included is the step of coupling an input signal on the first path to the third path and an output signal on the third path to the transmit in path. The step of algebraically combining reduces the value of the signal on the transmit in path by the value of the estimate of the correlation signal on the path, and also included are the steps of generating an initial estimate of the correlation signal through a process including convolution of the input signal and the estimated inpulse response coefficients, and algebraically combining the initial correlation signal estimate with the signal on the transmit in path to generate the error signal.

In both the apparatus and method, as compared with the estimated impulse response coefficients, the average estimated impulse response coefficients have a decreased variance with respect to the actual impulse response.

The foregoing and other objects, advantages and features of the invention will become apparent upon a consideration of the following detailed description, when taken in conjunction with the accompanying drawings.

DETAILED DESCRIPTION

Figure 1:
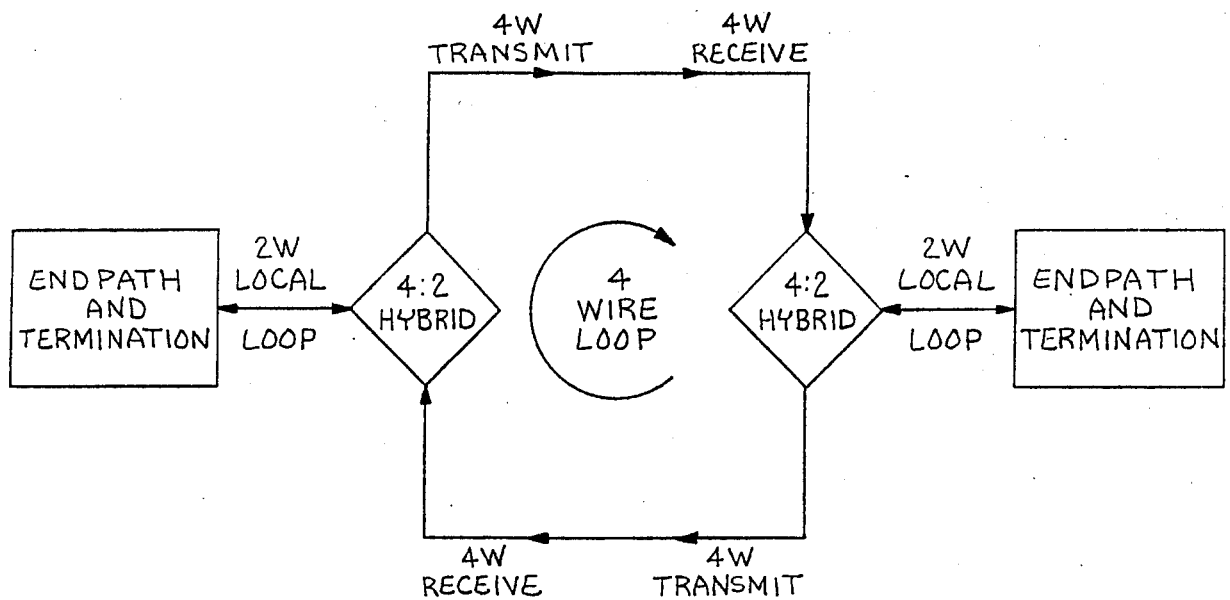
FIG. 1 illustrates a conventional telephone network in which 4:2 hybrid circuits join four wire and two wire segments at each end of the network.

Referring to FIG. 1, in a typical telephone connection, a pair of 4:2 hybrid circuits join a four wire (4W) segment with two wire (2W) segments at each end of the network. The hybrid circuits and the two pairs of wires in the 4W segment form a loop around which echo signals can propagate. Normally, a 4W receive signal is at a higher level than its echo on the 4W transmit path, i.e., there is loss across the hybrid circuit, which is a function of frequency and called transhybrid loss (THL).

It often is desirable to insert gain in the 4W paths to compensate for losses in the 2W segments, in which case the hybrid circuits provide loss and gain stages provide gain. If at any frequency, the net gain in the loop is greater than unity, an unstable condition exists. Once such a passband frequency is excited by a signal in either 2W segment, it will continue to grow as it propagates around the 4W loop, until it saturates at some level. To avoid this unstable condition, known as singing, the net gain in the loop must be less than unity at the frequencies of excitation. This may be accomplished by reducing the inserted gain or by increasing the loss across the hybrids. Reducing the gain may result in an unacceptable quality of service, so it is desirable to increase the THL.

By attenuating echo energy, echo cancellers used in long distance telephone networks effectively increase THL. However, echo cancellers are normally used only in networks of sufficient length that echo of a speaker's voice signal perceptibly degrades the quality of the connection. To increase THL in shorter networks, the art therefore contemplates using adaptive hybrid circuits, which operate much like echo cancellers.

Figure 2:
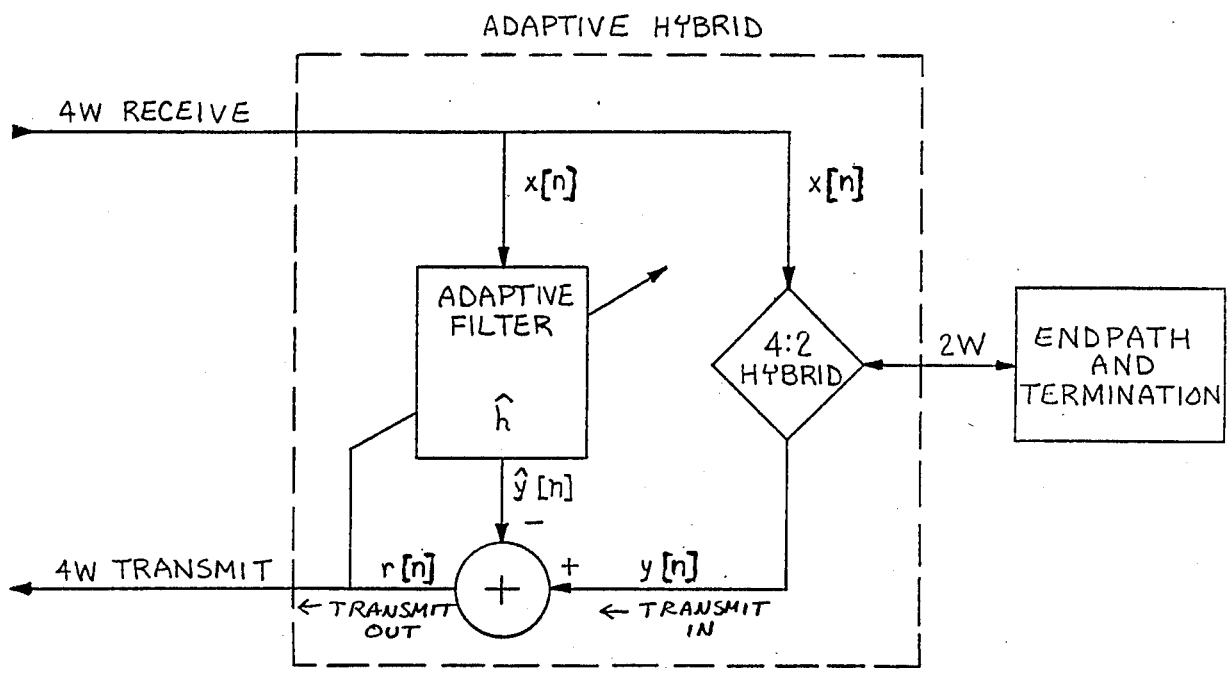
FIG. 2 shows a conventional 4:2 adaptive hybrid circuit at one end of a telephone network.

FIG. 2 illustrates a typical adaptive hybrid circuit, that includes a 4:2 hybrid for transferring input signals on the 4W receive path to the 2W path and output signals on the 2W path to a transmit in path portion of the 4W transmit path. Because of impedance mismatch, some of the 4W receive path energy is reflected onto the 4W transmit in path as an echo signal that is correlated to the receive path signal. To decrease echo energy transmitted over the 4W transmit out path, the adaptive hybrid circuit includes an adaptive transversal filter and a subtractor circuit. The adaptive filter develops estimated end path impulse response coefficients, and through a convolution process multiplies the coefficients and 4W receive path signal samples to generate an estimate of echo that will appear on the 4W transmit side of the 4:2 hybrid in response to signals on the 4W receive side. The echo estimate is then subtracted from the transmit in path signal in the subtractor circuit. The result of the subtraction process is referred to as a residual or error signal, and is sensed by the adaptive filter to update the estimated impulse response coefficients in a manner to decrease the power or absolute value of the residual signal.

The adaptive filter of FIG. 2 is used, in part, in the adaptive filter of the invention. The algorithm used in the adaptive filter of FIG. 2 is a variation of the Least Mean Squares (LMS), and is similar to that used in most echo cancellers. Let x and y be the 4W receive and 4W transmit path signals, respectively. The signal y is the sum of echo e, which is correlated to the receive path signal x, and some other signal v. Let the samples of the signals x, y, e and v at time n be denoted x[n], y[n], e[n] and v[n], respectively. Thus $$y[n] = e[n] + v[n] \quad (1)$$

The algorithm establishes a set of adjustable impulse response coefficients, or taps, having values at time n denoted $\hat{h}_i[n]$, where $i = 0, 1, \ldots, N-1$. The taps are estimates of the actual end path impulse response samples. An estimate of the echo at time n, $\hat{y}[n]$, is generated by means of a convolution process as $$\hat{y}[n] = x[n]\hat{h}_0[n] + x[n-1]\hat{h}_1[n] + \ldots + x[n-N+1]\hat{h}_{N-1}[n]. \quad (2)$$

The estimate of the echo, $\hat{y}[n]$, is then subtracted from the 4W transmit path signal y[n] to form an error or residual signal r[n], where $$r[n] = y[n] - \hat{y}[n]. \quad (3)$$

The residual signal r[n] then becomes the 4W transmit path signal.

The algorithm updates the estimated end path impulse response coefficient, $\hat{h}_i[n]$, $i = 0, 1, \ldots, N-1$, at every time interval n in an attempt to minimize the power of the residual signal r[n]. The update process is characterized by $$\hat{h}_i[n+1] = \hat{h}_i[n] + \mu[n]r[n]x[n-i], \quad (4)$$

where the adaptive gain $\mu[n]$ is a positive value that affects stability, convergence time and steady state performance.

Whenever there is a component of the signal y that is statistically uncorrelated with the signal x, for example the signal v or part of the signal v, there will in steady state be variance in the adaptive filter taps which prevents the filter from minimizing the energy of the residual signal. A logical approach to decreasing coefficient or tap variance is to lower the adaptive gain, and this strategy represents the standard approach to improving performance through reduced coefficient variance. However, the technique has two disadvantages. First, convergence time of the adaptive filter is linearly related to adaptive gain, so halving the gain doubles convergence time as average estimated impulse response coefficients which are separate and distinct from the estimated impulse response coefficients. Secondly, as the adaptive gain gets smaller, the number of data bits required to represent the estimated impulse response coefficients $\hat{h}_i$ increases, which leads to an increase in storage requirements of the adaptive filter and an increased computational burden on the convolution and update processors. If not enough bits are allocated to represent estimated impulse response coefficients, performance will degrade.

Figure 3:
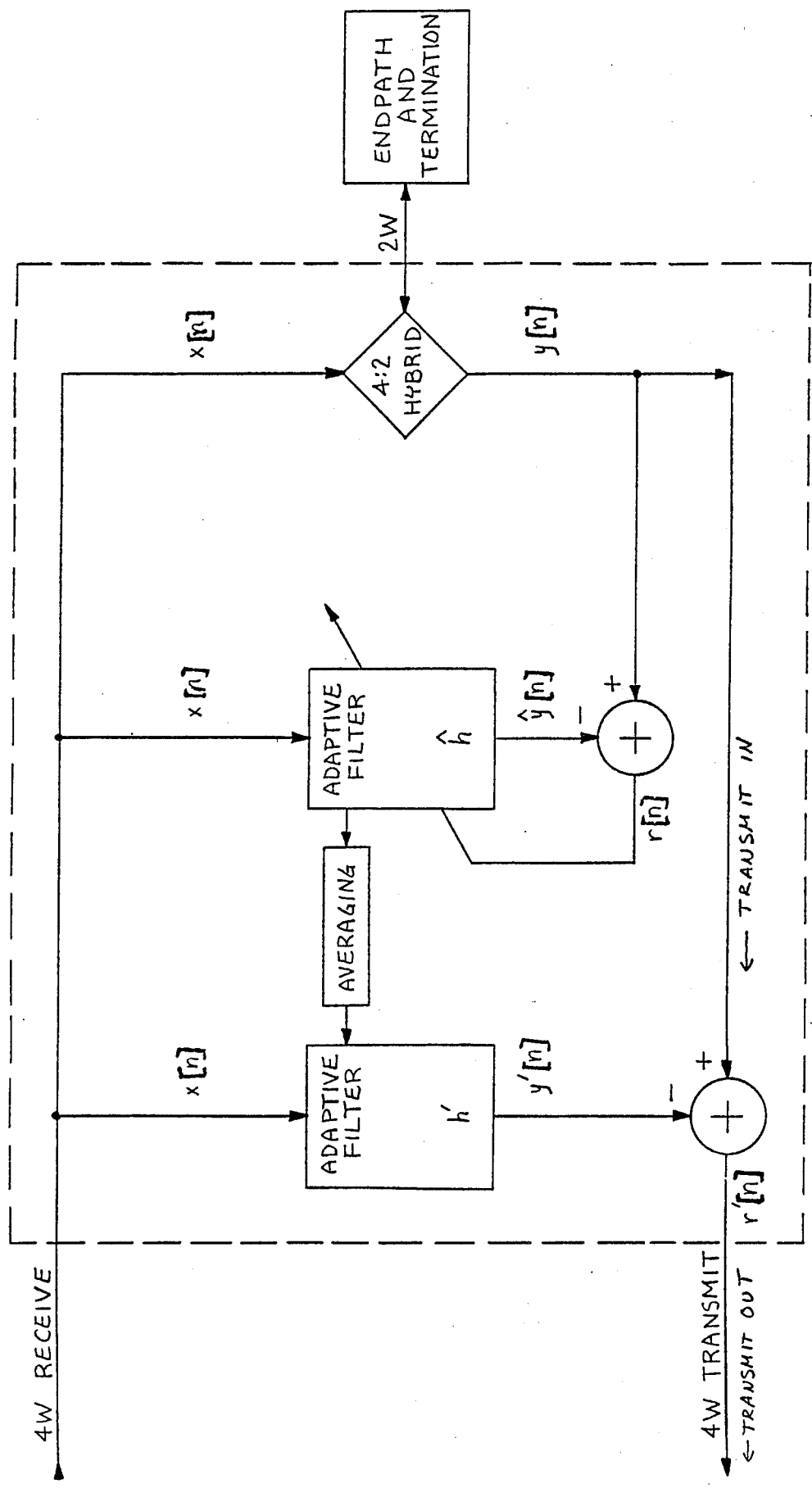
FIG. 3 illustrates a 4:2 adaptive hybrid circuit at one end of a telephone network, having an adaptive filter according to the teachings of the invention.

In overcoming problems associated with the prior practice of decreasing impulse response coefficient variance by decreasing adaptive gain, according to the invention, and with reference to FIG. 3, coefficient variance is reduced by a novel technique that may be termed "coefficient averaging". As the name implies, the technique contemplates computing an average value over a most recent time interval for each estimated impulse response coefficient $\hat{h}_i$. Similar to the conventional adaptive transversal filter, in the one of the invention an adaptive filter develops estimates of the end path impulse response coefficents, $\hat{h}_i$, i=0, 1, ..., N−1, and through a convolution process according to equation (2) generates an initial estimate $\hat{y}[n]$ of echo on the 4W transmit in path side of the 4:2 hybrid. The echo estimate is subtracted from the transmit in path signal $y[n]$ to form a residual or error signal $r[n]$, but in this case the residual signal does not become the transmit out path signal. Instead, the error signal is used only to update the estimated impulse response coefficients $\hat{h}_i$, each of which are passed individually through an averaging circuit to a second adaptive filter. The second adaptive filter is therefore supplied with an average value over a most recent time interval for each estimated impulse response coefficient $\hat{h}_i$, and through a convolution process multiplies the average estimated impulse response coefficients and 4W receive path signal samples $x[n]$ to generate a second echo estimate $y'[n]$ that more accurately represents actual echo than does the initial echo estimate $\hat{y}[n]$. The echo estimate $y'[n]$ is then subtracted from the signal on the 4W transmit in path to yield a transmit out path signal $r'[n]$.

Considering operation of the adaptive filter of the invention, let $h'_i[n]$ be the average of the corresponding estimated impulse response coefficient $\hat{h}_i$, i=0, 1, ..., N−1, computed through time n. In steady state, $h'_i[n]$ and $\hat{h}_i[n]$ have about the same mean, i.e., the value of the actual impulse response coefficient $h_i[n]$. However, the variances of the average estimated coefficents with respect to the actual coefficients will be less than that of the estimated coefficients, since the signal v adds to the error signal $r[n]$ and prevents perfect convergence during updating, and averaging of the coefficients decreases their variance due to random noise.

Just as the estimated impulse response coefficients $\hat{h}_i[n]$ are used to generate the echo estimate $\hat{y}[n]$ and the error signal $r[n]$, so are the average estimated impulse response coefficients $h'_i[n]$ used to generate the echo estimate $y'[n]$ and residual signal $r'[n]$ as follows:

$$y'[n] = x[n]h'_0[n] + x[n-1]h'_1[n] + \ldots + x[n-N+1]h'_{N-1}[n] \quad (5)$$

$$r'[n] = y[n] - y'[n] \quad (6)$$

The actual averaging operation may be carried out in various ways, e.g., by means of a low pass filter or by sample averaging. If accomplished by means of a low pass filter, it is contemplated that each estimated impulse response coefficient $\hat{h}_i$ be passed through a first order low pass filter according to the following equation:

$$h'_i[n] = ah'_i[n-1] + (1-a)\hat{h}_i[n], \quad (7)$$

where "a" is between 0.9 and 1. If sample averaging is used, then each average estimated impulse response coefficient $h'_i$ is computed as the average of the last several estimates of the impulse response coefficient $\hat{h}_i[m]$, m=n, n−1, ..., n−M, where M is some positive integer.

The decreased variance of the average estimated impulse response coefficients $h'_i$, as compared to the estimated coefficients $\hat{h}_i$, makes the echo estimate $y'[n]$ a generally better estimate of the 4W transmit in path signal $y[n]$ than the echo estimate $\hat{y}[n]$. In consequence, there is less distortion in the residual signal $r'[n]$ than in the residual signal $r[n]$. As seen in FIG. 3, the estimated impulse response parameters $\hat{h}_i[n]$ are updated as before, according to equation (4), based upon the value of the error signal $r[n]$, but the 4W transmit out signal is now $r'[n]$, the difference between the signal $y[n]$ and second echo estimate $y'[n]$.

As compared with decreasing impulse response coefficient variation by means of reducing adaptive gain, coefficient averaging requires slightly less storage and computation resources than does reducing adaptive gain. More significantly, while decreasing adaptive gain substantially increases the time required for convergence of the adaptive filter, coefficient averaging increases convergence time only by the length of the averaging process.

For telephone networks of a length sufficiently short that echo is not a problem and echo cancellers are not required, the coefficient averaging technique enables the adaptive hybrid circuit to converge to a point that the transhybrid loss of the circuit is sufficiently great to prevent singing on the network in the presence of signals in the passband of the system. Should the telephone network be sufficiently long that echo cancellers are used, then hybrid circuits at opposite ends of the network need not be of the adaptive type, since the echo cancellers will, in effect, provide enough THL to prevent singing. In the latter case, the coefficient averaging technique may advantageously be used in the echo cancellers to enhance attenuation of echo energy.

While embodiments of the invention have been described in detail, various modifications and other embodiments thereof may be devised by one skilled in the art without departing from the spirit and scope of the invention, as defined in the appended claims.

What is claimed is:

1. In an adaptive filter, comprising:
   first signal processing means for receiving an input signal and an error signal, for generating a plurality of estimated impulse response coefficients and being responsive to said error signal for periodically adjusting the values of said estimated impulse response coefficients;
   averaging circuit means coupled with said first signal processing means for receiving said plurality of estimated impulse response coefficients and for averaging the same to generate a plurality of average estimated impulse response coefficients which are separate and distinct from said estimated impulse response coefficients and have values in accordance with the average value over a most recent time interval of associated ones of said estimated impulse response coefficients; and second signal processing means for receiving the input signal and coupled with said averaging circuit means for receiving said average estimated impulse response coefficients, for generating an estimate of a signal correlated to the input signal, wherein said first signal processing means generates an initial estimate of said correlated signal, and including means for algebraically combining said initial correlated signal estimate with said correlated signal to generate said error signal.

2. In an adaptive filter as in claim 1, including means for algebraically combining said estimate of said correlated signal, generated by said second signal processing means, with said correlated signal to generate a residual signal.

3. In an adaptive filter, comprising:

first signal processing means for receiving an input signal and an error signal, for generating an estimated correlation characteristic and being responsive to said error signal for periodically adjusting the value of said estimated correlation characteristic;

averaging circuit means coupled with said first signal processing means for receiving said estimated correlation characteristic and for averaging the same to generate an average estimated correlation characteristic which is separate and distinct from said estimated correlation characteristic and has a value in accordance with the average value over a most recent time interval of said estimated correlation characteristic; and second signal processing means for receiving the input signal and coupled with said averaging circuit means for receiving said average estimated correlation characteristic, for generating an estimate of a signal correlated to the input signal, wherein said first signal processing means generates an initial estimate of said correlated signal, and including means coupled with said first signal processing means for algebraically combining said initial correlated signal estimate with said correlated signal to generate said error signal.

4. In an adaptive filter as in claim 3, including means coupled with said second signal processing means for algebraically combining said estimate of said correlated signal, generated by said second signal processing means, with said correlated signal to generate a residual signal.

5. In an adaptive filter, comprising:

first signal processing means for being coupled to a first transmission path for receiving an input signal on said path and for receiving an error signal, for generating an estimated correlation characteristic of an end path of the first and a second transmission path and being responsive to said error signal for periodically adjusting said estimated correlation characteristic of the end path;

averaging circuit means coupled with said first signal processing means for receiving said estimated correlation characteristic and for averaging the same to generate an average estimated correlation characteristic which is separate and distinct from said estimated correlation characteristic and has a value in accordance with the average value over a most recent time interval of said estimated correlation characteristic; and second signal processing means for being coupled with the first transmission path for receiving the input signal and coupled with said averaging circuit means for receiving said average estimated correlation characteristic, for generating an estimate of a signal occurring on the second transmission path in response to and correlated to the input signal on the first path, wherein said first signal processing means generates an initial estimate of said correlated signal in accordance with the values of said input signal and estimated correlation characteristic, and including means coupled to said first signal processing means and adapted to be coupled to the second transmission path for algebraically combining said initial correlated signal estimate with an output signal on the second path to generate said error signal.

6. In an adaptive filter as in claim 5, including means coupled with said second signal processing means and adapted to be coupled to the second transmission path for algebraically combining said estimate of said correlated signal, generated by said second signal processing means, and the output signal on the second path to generate a residual signal.

7. In an adaptive filter as in claim 6, wherein said estimated correlation characteristic generated by said first signal processing means comprises an estimated impulse response of the end path, said correlated signal is an echo signal occurring on the second path in response to the input signal on the first path, and said algebraic combining means coupled with said second signal processing means subtracts the correlated signal estimate generated thereby from the output signal on the second path to generate said residual signal.

8. In an adaptive filter, comprising:

first signal processing means for being coupled to a first transmission path for receiving an input signal on said path and for receiving an error signal, for generating an estimated impulse response of an end path of the first and a second transmission path and being responsive to said error signal for periodically adjusting said estimated impulse response of the end path;

averaging circuit means coupled with said first signal processing means for receiving said estimated impulse response and for averaging the same to generate an average estimated impulse response which is separate and distinct from said estimated impulse response and has a value in accordance with the average value over a most recent time interval of said estimated impulse response; and second signal processing means for being coupled with the first transmission path for receiving the input signal and coupled with said averaging circuit means for receiving said average estimated impulse response, for generating an estimate of a signal occurring on the second transmission path in response to and correlated to the input signal on the first path, wherein said first signal processing means generates an initial estimate of said correlated signal in accordance with the values of the input signal and estimated impulse response, and including means coupled to said first signal processing means and adapted to be coupled to the second transmission path for algebraically combining said initial correlated signal estimate with an output signal on the second path to generate said error signal.

9. In an adaptive filter as in claim 8, including means coupled with said second signal processing means and adapted to be coupled to the second transmission path for algebraically combining said estimate of said correlated signal, generated by said second signal processing means, and the output signal on the second path to generate a residual signal.

10. In an adaptive hybrid circuit, comprising:
means for being coupled to first, second and third transmission paths for coupling an input signal on the first path to the third path and an output signal on the third path to the second path;
first signal processing means for being coupled to the first transmission path to receive the input signal and for receiving an error signal, for generating a plurality of estimated impulse response coefficients forming an estimated impulse response of an end path of the first and second transmission paths and being responsive to said error signal for periodically adjusting the values of said plurality of estimated impulse response coefficients;
averaging circuit means coupled with said first signal processing means for receiving said discrete plurality of estimated impulse response coefficients and for averaging the same to generate a plurality of average estimated impulse response coefficients which are separate and distinct from said estimated impulse response coefficients and have values in accordance with the average value over a most recent time interval of associated ones of said estimated impulse response coefficients;
second signal processing means for being coupled to the first transmission path for receiving the input signal and coupled with said averaging circuit means for receiving said average estimated impulse response coefficients, for generating an estimate of an echo signal on the second transmission path that occurs in response to the input signal on the first transmission path; and
means coupled with said second signal processing means and for being coupled with the second transmission path for separating the second transmission path into a transmit in path, on which the echo signal occurs, and a transmit out path, and for subtracting said estimate of the echo signal from the signal on the transmit in path,
said first signal processing means generating an estimate of the echo signal on the transmit in path in accordance with the values of the input signal and estimated impulse response coefficients, and including means coupled with said first signal processing means and adapted to be coupled with the transmit in path for algebraically combining said initial echo estimate signal with the signal on the transmit in path to generate said error signal.

11. In an adaptive hybrid circuit as in claim 10, wherein said algebraic combining means coupled with said first signal processing means subtracts said initial echo estimate signal from the signal on the transmit in path to generate said error signal.

12. In an adaptive hybrid circuit, comprising:
means for being connected between first, second and third transmission paths for coupling an input signal on he first path to the third path and for coupling an output signal on the third path to the second path;
first signal processing means for being coupled to the first transmission path for receiving the input signal and for receiving an error signal, for generating an estimated correlation characteristic of an end path of the first and second transmission paths and being responsive to said error signal for periodically updating said estimated correlation characteristic;
averaging circuit means coupled with said first signal processing means for receiving said estimated correlation characteristic and for averaging the same to generate an average estimated correlation characteristic which is separate and distinct from said estimated correlation characteristic and has a value in accordance with the average value over a most recent time interval of said estimated correlation characteristic;
second signal processing means for being coupled with the first transmission path for receiving the input signal and coupled with said averaging circuit means for receiving said average estimated correlation characteristic, for generating an estimate of an echo signal occurring on the second transmission path in response to the input signal on the first transmission path; and
means coupled with said second signal processing means and for being coupled with the second transmission path for separating the second transmission path into a transmit in path, on which the echo signal occurs, and a transmit out path, and for subtracting said echo estimate signal from the signal on the transmit in path,
wherein said first signal processing means generates an initial estimate of the echo signal on the transmit in path in accordance with the value of the input signal and said estimated correlation characteristic, and including means coupled with said first signal processing means and adapted to be coupled with the transmit in path for algebraically combining said initial echo estimate signal with the signal on the transmit in path to generate said error signal.

13. A method of generating an estimate of a signal on a second transmission path that occurs in response to and is correlated in an input signal on a first transmission path, comprising the steps of:
generating with an adaptive filter a plurality of estimated impulse response coefficients forming an estimated impulse response of an end path of the first and second transmission paths;
periodically adjusting the values of the estimated impulse response coefficients in accordance with the value of an error signal;
generating a plurality of average estimated impulse response coefficients which are separate and distinct from the estimated impulse response coefficients and have values in accordance with the average value over a most recent time interval of associated ones of the estimated impulse response coefficients;
generating an estimate of the correlated signal through a process including convolution of the input signal and the average estimated impulse response coefficients;
generating an initial estimate of the correlated signal through a process including convolution of the input signal and the estimated impulse response coefficients; and algebraically combining the initial estimate of the correlated signal with the correlated signal to generate the error signal.

14. A method of generating an estimate of a signal on a second transmission path that occurs in response to and is correlated to an input signal on a first transmission path, comprising the steps of:

generating with an adaptive filter an estimate of a correlation characteristic between the input signal on the first transmission path and the signal that occurs in response thereto on the second transmission path;

periodically adjusting the value of the estimated correlation characteristic in accordance with the value of an error signal;

generating an average estimated correlation characteristic which is separate and distinct from the estimated correlation characteristic and has a value in accordance with the average value over a most recent time interval of the estimated correlation characteristic;

generating the estimate of the correlated signal in accordance with the values of the input signal and the average estimated correlation characteristic;

generating an initial estimate of the correlated signal in accordance with the values of the input signal and the estimated correlation characteristic; and algebraically combining the initial estimate of the correlated signal with the correlated signal to generate the error signal.

15. A method of converting signals between first, second and third transmission paths, comprising the steps of:

coupling an input signal on the first path to the third path and an output signal on the third path to the second path;

generating with an adaptive filter a plurality of estimated impulse response coefficients forming an estimated impulse response of an end path of the first and second paths;

periodically adjusting the values of the estimated impulse response coefficients in accordance with the value of an error signal;

generating a plurality of average estimated impulse response coefficients which are separate and distinct from the estimated impulse response coefficients and have values in accordance with the average value over a most recent time interval of associated ones of the estimated impulse response coefficients;

generating an estimate of an echo signal occurring on the second path in response to the input signal on the first path through a process including convolution of the input signal and the average estimated impulse response coefficients;

reducing the value of the signal on the second path by the value of the echo estimate signal;

generating an initial estimate of the echo signal on the second path through a process including convolution of the input signal and the plurality of estimated impulse response coefficients; and algebraically combining the initial echo estimate signal with the signal on the second path to generate the error signal.

16. A method of generating an estimate of a signal that occurs in response to and is correlated to a reference signal, comprising the steps of:

generating with an adaptive filter an estimate of a correlation characteristic between the reference signal and the correlated signal;

periodically adjusting the value of the estimated correlation characteristic in accordance with the value of an error signal;

generating an average estimated correlation characteristic which is separate and distinct from the estimated correlation characteristic and has a value in accordance with the average value over a most recent time interval of the estimated correlation characteristic;

generating the estimate of the correlated signal in accordance with the values of the reference signal and the average estimated correlation characteristic;

generating an initial estimate of the correlated signal in accordance with the values of the reference signal and the estimated correlation characteristic; and algebraically combining the initial estimate of the correlated signal with the correlated signal to generate the error signal.

17. An adaptive transversal filter, comprising:

an adaptive filter for being supplied with an input signal and being responsive to an error signal for generating and periodically adjusting the values of a plurality of estimated impulse response coefficients representing an impulse response to a transmission path;

averaging circuit means coupled with said adaptive filter for generating a plurality of average estimated impulse response coefficients having value in accordance with the average values over a most recent time interval of associated ones of said estimated impulse response coefficients; and signal processing means for being supplied with the input signal and coupled with said averaging circuit means for receiving said average estimated impulse response coefficients, for generating an estimate of a signal correlated to the input signal.

18. An adaptive transversal filter as in claim 17, wherein said adaptive filter generates an initial estimate of said correlated signal, and including means for algebraically combining said initial correlated signal estimate with said correlated signal to generate said error signal.

19. An adaptive transversal filter as in claim 18, including means for algebraically combining said estimate of said correlated signal, generated by said signal processing means, with said correlated signal to generate a residual signal.

20. An adaptive transversal filter, comprising:

an adaptive filter for being coupled to a first transmission path for receiving an input signal on said path and being responsive to an error signal for generating and periodically adjusting an estimated correlation characteristic of an end path of the first and a second transmission path;

averaging circuit means coupled with said adaptive filter for generating an average estimated correlation characteristic having a value in accordance with the average value over a most recent time interval of said estimated correlation characteristic; and signal processing means for being coupled to the first transmission path for receiving the input signal and to said averaging circuit means for receiving said average estimated correlation characteristic, for generating an estimate of a signal occurring on the second transmission path in response to and correlated to the input signal on the first path.

21. An adaptive transversal filter as in claim 20, wherein said adaptive filter generates an initial estimate of said correlated signal in accordance with the values of said input signal and estimated correlation characteristic, and including means coupled to said adaptive filter and for being coupled to the second transmission path for algebraically combining said initial correlated signal estimate with an output signal on the second path to generate said error signal.

22. An adaptive transversal filter as in claim 21, including means coupled with said signal processing means and for being coupled to the second transmission path for algebraically combining said estimate of said correlated signal, generated by said signal processing means, and the output signal on the second path to generate a residual signal.

23. An adaptive transversal filter as in claim 22, wherein said estimated correlation characteristic generated by said adaptive filter comprises an estimated impulse response of the end path, said correlated signal is an echo signal occurring on the second path in response to the input signal on the first path, and said algebraic combining means coupled with said signal processing means subtracts the correlated signal estimate generated thereby from the output signal on the second path to generate said residual signal.

24. An adaptive hybrid circuit, comprising:
means adapted to be coupled to first, second and third transmission paths for coupling an input signal on the first path to the third path and an output signal on the third path to the second path;
an adaptive filter for being coupled to the first transmission path for being supplied with the input signal and being responsive to an error signal for generating and periodically adjusting the values of a plurality of estimated impulse response coefficients forming an estimated impulse response of an end path of the first and second transmission paths;
averaging circuit means coupled with said adaptive filter for generating a plurality of average estimated impulse response coefficients having values in accordance with the average value over a most recent time interval of associated ones of said estimated impulse response coefficients;
signal processing means, adapted to be coupled to the first transmission path for being supplied with the input signal and coupled to said averaging circuit means for receiving said average estimated impulse response coefficients, for generating an estimate of an echo signal on the second transmission path that occurs in response to the input signal on the first transmission path; and
means coupled to said signal processing means and adapted to be coupled to the second transmission path for separating the second transmission path into a transmit in path, on which the echo signal occurs, and a transmit out path, and for subtracting said estimate of the echo signal from the signal on the transmit in path.

25. An adaptive hybrid circuit as in claim 24, said adaptive filter generating an estimate of the echo signal on the transmit in path in accordance with the values of the input signal and estimated impulse response coefficients, and including means coupled to said adaptive filter and adapted to be coupled to the transmit in path for algebraically combining said initial echo estimate signal with the signal on the transmit in path to generate said error signal.

26. A method of generating an estimate of a signal on a second transmission path that occurs in response to and is correlated to an input signal on a first transmission path, comprising the steps of:
generating with an adaptive filter a plurality of estimated impulse response coefficients forming an estimated impulse response of an end path of the first and second transmission paths;
periodically adjusting the values of the estimated impulse response coefficients in accordance with the value of an error signal;
generating a plurality of average estimated impulse response coefficients having values in accordance with the average values over a most recent time interval of associated ones of the estimated impulse response coefficients; and
generating with a signal processing circuit an estimate of the correlated signal through a process including convolution of the input signal and the average estimated impulse response coefficients.

27. A method as in claim 26, including the steps of:
generating with the adaptive filter an initial estimate of the correlated signal through a process including convolution of the input signal and the estimated impulse response coefficients; and
algebraically combining the initial estimate of the correlated signal with the correlated signal to generate the error signal.

28. A method of generating an estimate of a signal on a second transmission path that occurs in response to and is correlated to an input signal on a first transmission path, comprising the steps of:
generating with an adaptive filter an estimate of a correlation characteristic between the input signal on the first transmission path and the signal that occurs in response thereto on the second transmission path;
periodically adjusting the value of the estimated correlation characteristic in accordance with the value of an error signal;
generating an average estimated correlation characteristic having a value in accordance with the average value over a most recent time interval of the estimated correlation characteristic; and
generating with a signal processing circuit the estimate of the correlation signal in accordance with the values of the input signal and the average estimated correlation characteristic.

29. A method as in claim 28, including the steps of:
generating with the adaptive filter an initial estimate of the correlated signal in accordance with the values of the input signal and the estimated correlation characteristic; and
algebraically combining the initial estimate of the correlated signal with the correlated signal to generate the error signal.

30. A method of converting signals between first, second and third transmission paths, comprising the steps of:
coupling an input signal on the first path to the third path and an output signal on the third path to the second path;
generating with an adaptive filter a plurality of estimated impulse response coefficients forming an estimated impulse response of an end path of the first and second paths;

periodically adjusting the values of the estimated impulse response coefficients in accordance with the value of an error signal;

generating a plurality of average estimated impulse response coefficients having values in accordance with the average values over a most recent time interval of associated ones of the estimated impulse response coefficients;

generating with a signal processing circuit an estimate of an echo signal occurring on the second path in response to the input signal on the first path through a process including convolution of the input signal and the average estimated impulse response coefficients; and reducing the value of the signal on the second path by the value of the echo estimate signal.

31. A method as in claim 30, including the steps of:

generating with the adaptive filter an initial estimate of the echo signal on the second path through a process including convolution of the input signal and the plurality of estimated impulse response coefficients; and algebraically combining the echo estimate signal with the signal on the second path to generate the error signal.

* * * * *